Nov. 21, 1950 R. R. SEARLES 2,530,665
BEARING
Filed July 21, 1943
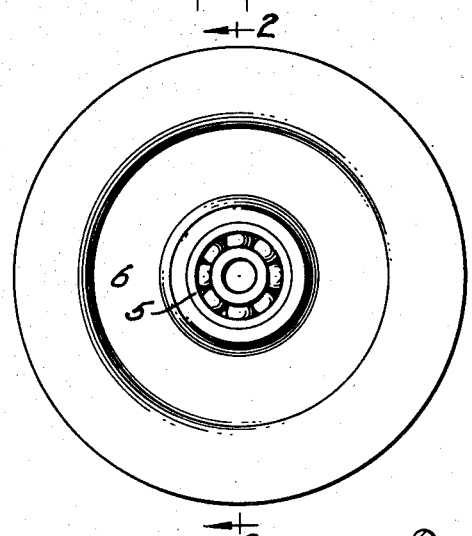
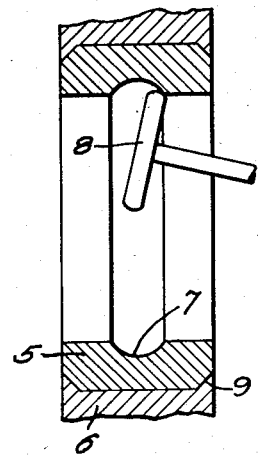
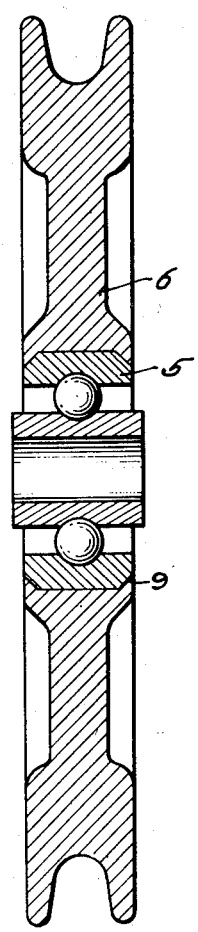
INVENTOR
Raymond R. Searles
BY
ATTORNEYS.

Patented Nov. 21, 1950

2,530,665

UNITED STATES PATENT OFFICE 2,530,665

BEARING

Raymond R. Searles, New Britain, Conn., assignor to The Fafnir Bearing Company, New Britain, Conn., a corporation of Connecticut Application July 21, 1943, Serial No. 495,583

13 Claims. (Cl. 308—190)

1

My invention relates to an anti-friction bearing mounting and method of forming the same and eliminating out-of-roundness of a bearing ring. This application is a continuation in part of my application Serial No. 349,836, filed August 2, 1940, now abandoned.

Heretofore, anti-friction bearings have been mounted in pulleys and other devices or housings formed of Bakelite or other material of a plastic or semi-plastic nature, all of which will be referred to generically herein as plastics. When the outer bearing ring is mounted in a plastic housing, the outer ring is quite often distorted by irregularities in the bore which receives the outer ring or due to irregularities in the outer surface of the ring itself. Any distortion of the outer bearing ring is referred to as out-of-roundness and out-of-roundness causes rapid deterioration of the bearing and failure is often the result.

It is an object of my invention to provide an improved method of mounting the outer ring of an anti-friction bearing in a plastic housing and eliminating out-of-roundness of such outer bearing rings.

In the drawings which show, for illustrative purposes only, a single embodiment of the invention—

Fig. 1 is a side view of a pulley, illustrative of features of the invention;

Fig. 2 is an enlarged sectional view, taken substantially in the plane of the line 2—2 of Fig. 1;

Fig. 3 is a fragmentary, more or less diagrammatic view, illustrative of a step in the method of mounting the outer bearing ring and eliminating out-of-roundness.

The invention is illustrated as embodied in a Bakelite or other type of plastic pulley, but it is to be understood that the invention is by no means limited to embodiment in a pulley.

As has been indicated above, it has heretofore been the practice to form a bearing housing, which in this case is illustrated as a pulley of Bakelite, or in general of plastic material, by casting or coring the hole or bore for the outer ring of the bearing, or by machining, grinding, or otherwise forming the same. However, due to irregularities in manufacture, either of the outer bearing ring itself or of the housing, the bearing ring when forced into the bore of the plastic housing is often distorted so as to produce out-of-roundness. Such out-of-roundness is often the cause of rapid deterioration and failure of the bearing.

2

My invention is directed to a method and means of securing or mounting the outer bearing ring in a plastic housing and eliminating any out-of-roundness.

In carrying out my invention in its preferred form, an outer bearing ring 5 to be mounted in, say, a pulley or any other type of plastic housing 6 is put in the mold and the plastic housing 6 is formed thereabout by any of the well-known methods, but which for convenience herein will be termed "casting." When the bearing ring 5 has been cast in place in the plastic housing 6 and the plastic is allowed to cool or is otherwise cured or treated, the plastic shrinks and often produces undue and unequally distributed strains on the outer bearing ring. Such unequally distributed strains would produce out-of-roundness in a finished bearing ring and I eliminate out-of-roundness by casting the outer ring in its plastic housing without any effort to maintain perfect roundness of the outer bearing ring, and after the shrinkage and other strains have been put on the outer bearing ring I grind or finish grind the raceway surface 7, which may be a ball raceway or the raceway for a roller bearing. In the form illustrated more or less diagrammatically in Fig. 3, I may employ a grinding wheel 8 in an oscillating type of grinder so that the arcuate raceway 7 will be ground while the bearing ring and its housing are being rotated about the axis of the bearing ring. The method of grinding raceways on oscillators or by form grinding are of course well known. The outer bearing ring, cast in a plastic housing and distorted by shrinkage of the plastic and afterwards ground while rotating the bearing ring about its own axis while being ground, will provide a properly mounted outer ring and all effect of out-of-roundness so often encountered in mounting outer bearing rings will be eliminated.

The outer peripheral surface of raceway 5 is provided with beveled edges 9 and the inner surface of the body portion 6 is centrally channelled to provide a continuous mating surface with the outer surface and the bevelled edges of the raceway. Such construction serves to prevent axial movement of the raceway with respect to the body or plastic housing 6.

While the invention has been described in considerable detail and a single embodiment illustrated, it is to be understood that changes and modifications may be made within the scope of the invention as defined in the appended claims.

I claim:

1. A device of the character described comprising a bimaterial unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body member being of different material than the ring but of a degree of hardness to withstand the load without materially changing its repose dimensions, and said ring having an outer surface permanently bonded to the material of the body to mount and hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

2. In a device of the character described comprising a bimaterial unitary substantially integral structure including a body member, a single one piece preformed continuous hardened metal anti-friction bearing raceway ring mounted in said body member and forming a track for the rolling elements and of sufficient thickness to carry the normal rolling load, said body member being of a different material than the raceway ring but of a degree of hardness to withstand the load without materially changing its repose dimensions, said raceway ring having an outer surface permanently bonded to the material of the body to hold the ring permanently in a given position in said body, whereby the track surface of said raceway ring may be finished after mounting of the ring in the body and bonding it thereto so that any out of roundess of the ring due to stresses of mounting and bonding the ring in the body may be corrected and the track surface may be brought into exact circular form.

3. A device of the character described comprising a unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body member being pressure cast against the ring and of a degree of hardness to withstand the load without materially changing its repose dimensions, and said ring having an outer surface permanently bonded to the body to hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

4. A device of the character described comprising a bimaterial unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body member being of a different material than the ring but of a degree of hardness to withstand the load without materially changing its repose dimensions, the outer cylindrical surface of said raceway ring being of less width than the body member so that its side walls adjacent said surface are spaced inwardly of the side walls of the body and the diameter of its face having the track being different from that of the adjacent surface of the body member so that it is spaced above this surface, and said ring having an outer surface permanently bonded to the material of the body to hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

5. A device of the character described comprising a unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body member being pressure cast to substantially finished size against the ring and of a degree of hardness to withstand the load from the ring without materially changing its repose dimensions, the outer cylindrical surface of said raceway ring being of less width than the body member so that its side walls adjacent said surface are spaced inwardly of the side walls of the body, and said ring having an outer surface permanently bonded to the body to hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

6. An antifriction bearing ring comprising two ring sections only, one of said ring sections comprising a single one piece preformed continuous hardened metal ring forming a track for the rolling elements and of sufficient thickness to carry the normal rolling load, and the other ring section comprising a single one piece ring of different material cast to finished size against the first ring section and permanently bonded thereto, said second ring being of a degree of hardness to withstand the load without materially changing its repose dimensions, the outer cylindrical surface of the track ring being of less width than the backing ring so that its side walls adjacent said surface are spaced inwardly of the side walls of the backing ring and the diameter of its face having the track being different from that of the corresponding face of the backing ring so that it is spaced above this face.

7. An antifriction bearing member comprising a single one piece preformed continuous circular ring of hardened metal forming a track for the rolling elements and of sufficient thickness to carry the normal rolling load, and a single one piece continuous supporting backing member for said ring permanently bonded to the ring and formed of a different material from the ring but of a degree of hardness to withstand the load without materially changing its repose dimensions, said backing member being of greater width than the outer cylindrical surface of the ring, and the diameter of the surface of the ring having the track being different from that of the adjacent surface of the backing member so that it is spaced above this latter surface.

8. An antifriction bearing member comprising a single one piece preformed continuous circular ring of hardened metal forming a track for the rolling elements and of sufficient thickness to carry the normal rolling load, and a single one-piece continuous backing and supporting member for the ring of different material pressure cast to substantially the finished size and shape against the ring and permanently bonded to the ring to complete the form of the finished bearing member, said backing member being of greater width than the outer cylindrical surface of the ring so that the side walls of this member are spaced outwardly of the side walls of the ring adjacent said surface and the diameter of the face of the ring having the track being different from that of the adjacent surface of the backing member so that it is spaced above this surface.

9. An antifriction bearing member comprising a single one piece preformed continuous circular ring of hardened metal having a surface forming a track for the rolling elements and of sufficient thickness to carry the normal rolling load, a single one piece continuous backing and supporting member for the ring composed of a different material pressure cast against the ring and permanently bonded to the ring, said backing member being of greater width than the outer cylindrical surface of the ring so that the side walls of this member are spaced outwardly of the side walls of the ring adjacent said surface, and the circular surface of the face of the ring having the track surface being above the adjacent surface of the backing member to provide exposed shoulders on the sides of the ring spaced inwardly of the sides of the backing member.

10. A two element antifriction bearing ring member comprising a one piece preformed continuous circular hardened metal insert ring forming a track for the rolling elements and of sufficient thickness to carry the normal rolling load, and a one piece supporting and backing ring for the insert ring of metal but of a degree of hardness to withstand the load from the insert ring without materially changing its repose dimensions, said insert and backing rings being permanently bonded together, the outer cylindrical surface of said insert ring being of less width than the backing ring so that the side walls of the backing ring are spaced outwardly of the side walls of the insert ring adjacent said surface and the diameter of the face of the insert ring having the track being different from that of the adjacent surface of the backing ring so that it is spaced above this latter surface.

11. A two element antifriction bearing member comprising a one piece preformed continuous circular hardened metal insert ring forming a track for the rolling elements and of sufficient thickness to carry the normal rolling load, and the remainder of the member being a one-piece supporting backing ring for the insert ring made of a different material but of a degree of hardness to withstand the load from the first ring without materially changing its repose dimensions and to which the insert ring is permanently bonded, said backing ring being of greater width than the outer cylindrical surface of the insert ring so that the side walls of the backing ring are spaced outwardly of the side walls of the insert ring adjacent said surface and the circular face of the insert ring having the track surface being above the adjacent surface of the backing ring to provide exposed surfaces on the sides of the insert ring spaced inwardly of the sides of the backing ring.

12. A device of the character described comprising a bimaterial unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body member being of a different material than the ring but of a degree of hardness to withstand the load without materially changing its repose dimensions, said raceway ring having an outer surface having beveled peripheral edges, the inner adjacent surface of said body member being centrally channeled to provide a continuous mating surface with the surface and bevelled edges of said raceway ring, said mated surfaces being permanently bonded to hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

13. A device of the character described comprising a unitary substantially integral rotatable structure including a circular body member in the form of a pulley or similar article and formed on its periphery to cooperate with a driving means running thereon, a single one piece preformed continuous hardened metal anti-friction bearing raceway ring mounted in said body concentric with said periphery forming a track for the rolling elements and of sufficient thickness to carry the normal rolling load, said body member being pressure cast to substantially finished size against the ring and of a degree of hardness to withstand the load from the ring without materially changing its repose dimensions, said raceway ring having an outer surface having bevelled peripheral edges, the inner adjacent surface of said body member being centrally channeled to provide a continuous mating surface with the surface and bevelled edges of said raceway ring, said mated surfaces being permanently bonded to hold the ring permanently in a given position in said body whereby the track surface may be finished with respect to the pitch line of said working periphery after mounting of the ring in the body and bonding it thereto so that the track surface may be brought into exact axial and concentric alignment with the pitch line of the working periphery of the body member.

RAYMOND R. SEARLES.

REFERENCES CITED

The following references are of record in the file of this patent:

UNITED STATES PATENTS

| Number | Name | Date |
|---|---|---|
| 1,076,605 | Reston | Oct. 21, 1913 |
| 1,418,152 | Logan | May 30, 1922 |
| 1,984,718 | Wistrand | Dec. 18, 1934 |
| 2,102,850 | Koppel | Dec. 21, 1937 |
| 2,134,508 | Floyd | Oct. 25, 1938 |